Figure 1:
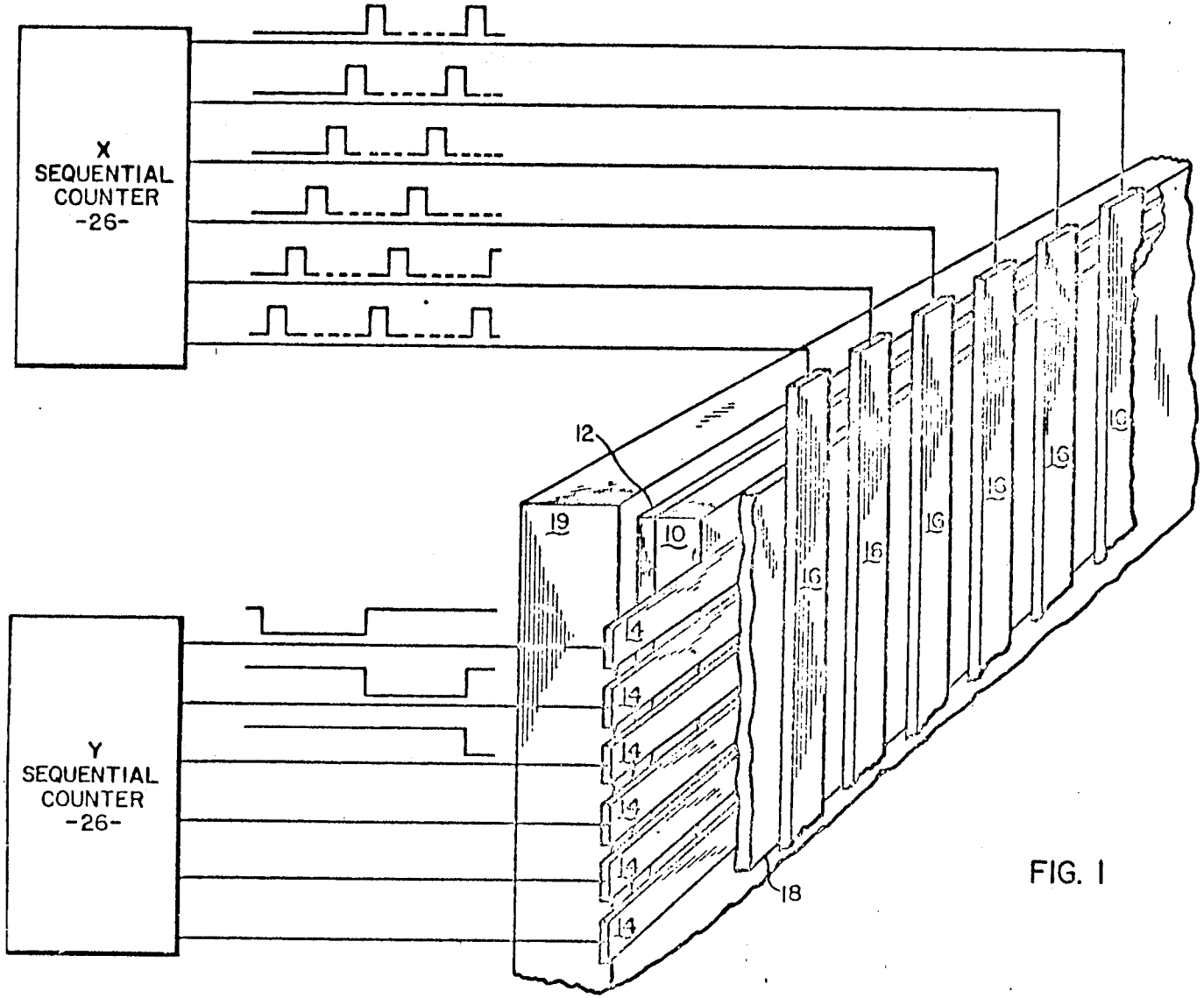
Figure 2:
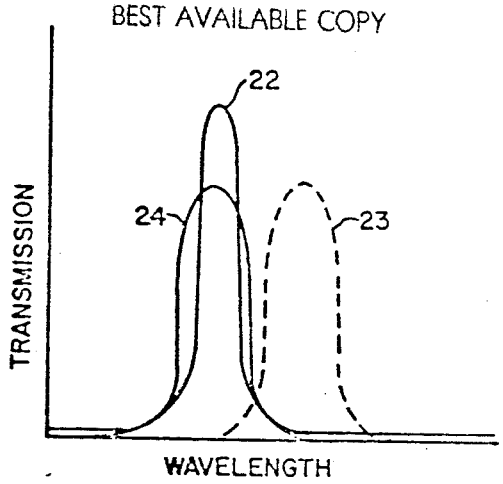
Figure 3:
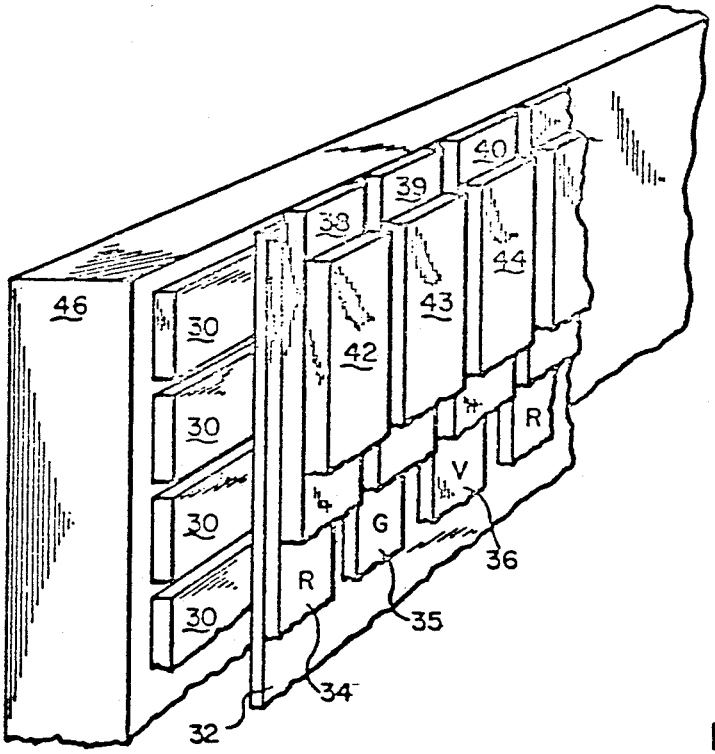

T856,016

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 12, 1968

856 O.G. 335

544,596

SOLID STATE OPTICAL DISPLAY FOR DISPLAYING DATA IN COLOR

Stuart M. Oliver, 424 N. Oakhurst Drive, Beverly Hills, Calif. 90210

Filed Apr. 22, 1966. Published Nov. 12, 1968

Class 178—5.4

2 Sheets Drawings. 9 Pages Specification

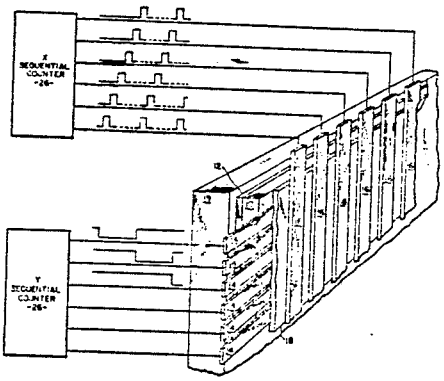

An X–Y display matrix with very high speed switching characteristics which can display data in color or a pluraiity of colors. The display comprises a panel containing a narrow band optical filter that is paired with a layer of electrochromic material disposed between transparent conductors of an X–Y matrix. When suitable potentials are applied to selected conductors of the matrix, the electrochromic material will exhibit a spectral shift so that its pass band will match that of the filter, whereby a projected light will pass through that portion of the display. If desired, the optical filter may be selected so that it matches the pass band of the ambient electrochromic material and may thus be shifted to mismatch the filter pass band to block a portion of the light projected through the display.

T 856,016

544596

T 856,016

BEST AVAILABLE COPY

INVENTOR.
STUART M. OLIVER

BY Joseph R. Dwyer
ATTORNEY

544596
OR IN 24/858

544596

BEST AVAILABLE COPY

INVENTOR.
STUART M. OLIVER

BY Jasper Bergen
ATTORNEY